(12) United States Patent
Ishida et al.

(10) Patent No.: US 9,628,306 B2
(45) Date of Patent: Apr. 18, 2017

(54) PULSE GENERATION DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Yoshihito Ishida, Tokyo (JP); Yasushi Aoyagi, Tokyo (JP); Kei Takahashi, Tokyo (JP)

(73) Assignees: FURUKAWA ELECTRIC CO., LTD, Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 0 days.

(21) Appl. No.: 14/867,912

(22) Filed: Sep. 28, 2015

(65) Prior Publication Data

US 2016/0028566 A1    Jan. 28, 2016

Related U.S. Application Data

(63) Continuation of application No. PCT/JP2014/058810, filed on Mar. 27, 2014.

(30) Foreign Application Priority Data

Mar. 29, 2013  (JP) ................................. 2013-072840

(51) Int. Cl.
*H03K 7/08* (2006.01)
*H04L 25/49* (2006.01)
(Continued)

(52) U.S. Cl.
CPC .......... *H04L 25/4902* (2013.01); *G01S 7/282* (2013.01); *H04L 27/122* (2013.01)

(58) Field of Classification Search
CPC .... H04L 25/4902; H04L 27/122; G01S 7/282
See application file for complete search history.

(56) References Cited

U.S. PATENT DOCUMENTS 4,698,637 A   10/1987 Bertocchi
5,497,160 A    3/1996 Koehler et al.
(Continued)

FOREIGN PATENT DOCUMENTS

JP       57-564      1/1982
JP    62-157582      7/1987
(Continued)

OTHER PUBLICATIONS

Japanese Office Action dated Oct. 3, 2014 and issued in Japanese Patent Application No. 2014-533300. With English translation (5 pages).

(Continued)

*Primary Examiner* — Syed Haider
(74) *Attorney, Agent, or Firm* — Oblon, McClelland, Maier & Neustadt, L.L.P.

(57) ABSTRACT

Provided is a pulse generation device capable of suitably adjusting and outputting a pulse pattern by a simple configuration. A pulse generation device (100) includes a radio frequency oscillator (110) that generates a carrier wave of a certain frequency, a baseband pulse generating unit (120) that generates a signal having a certain pulse shape at a baseband, a timing generator (130) that controls a timing to generate a pulse through the baseband pulse generating unit (120), and a mixer (140) that modulates the carrier wave output from the radio frequency oscillator (110) using the pulse output from the baseband pulse generating unit (120). The timing generator (130) can adjust a waveform of the pulse output from the baseband pulse generating unit (120).

6 Claims, 3 Drawing Sheets

(51) Int. Cl.
*G01S 7/282* (2006.01)
*H04L 27/12* (2006.01)

(56) References Cited

U.S. PATENT DOCUMENTS

| | | | | |
|---|---|---|---|---|
| 5,619,224 | A * | 4/1997 | Hoshino | G09G 3/3625 345/691 |
| 6,690,741 | B1 | 2/2004 | Larrick, Jr. | |
| 7,839,916 | B1 * | 11/2010 | Luecke | G01S 19/12 375/147 |
| 9,217,790 | B2 | 12/2015 | Kishigami et al. | |
| 2003/0006922 | A1 * | 1/2003 | Morimoto | H03K 5/01 341/144 |
| 2003/0076136 | A1 * | 4/2003 | McCorkle | H03K 5/05 327/112 |
| 2008/0205559 | A1 * | 8/2008 | Iida | H03K 3/66 375/343 |
| 2008/0212669 | A1 * | 9/2008 | Yamazaki | H03K 3/64 375/238 |
| 2013/0147655 | A1 | 6/2013 | Kishigami et al. | |
| 2014/0043083 | A1 * | 2/2014 | Hirayama | G01S 7/282 327/299 |

FOREIGN PATENT DOCUMENTS

| | | |
|---|---|---|
| JP | 2002-181921 | 6/2002 |
| JP | 2007-336054 | 12/2007 |
| WO | WO 2012/029241 A1 | 3/2012 |

OTHER PUBLICATIONS

International Search Report issued Apr. 28, 2014 in PCT/JP2014/058810, filed on Mar. 27, 2014.
Office Action mailed May 5, 2016 in Chinese Patent Application No. 201480018306.8 (with English Translation).
Extended European Search Report issued in European Patent Application No. 14776500.2 mailed Oct. 5, 2016.
Chinese Office Action issued Oct. 26, 2016 in Chinese Patent Application No. 201480018306.8 with English translation, 9 pages.

* cited by examiner

PULSE GENERATION DEVICE

CROSS REFERENCE TO RELATED APPLICATION

The present application is a Continuation Application of PCT/JP2014/058810, filed on Mar. 27, 2014, which is based and claims the benefit of priority from Japanese Patent Application No. 2013-072840, filed on Mar. 29, 2013. The entire contents of the above-noted documents are incorporated herein by reference in their interity.

TECHNICAL FIELD

The present invention relates to a pulse generation device used in, for example, a radar that radiates an impulse through a radio wave and measures a distance to an object.

BACKGROUND ART

A general radio frequency pulse generation device used in, for example, a radar generates a pulse signal having a certain pulse width through a pulse generator, inputs the pulse signal to a low pass filter having a certain frequency characteristic to generate a monopulse, inputs the monopulse to a mixer, and multiplies a carrier wave input from a radio frequency oscillator of a certain frequency by the monopulse to generate a radio frequency pulse. The generated radio frequency pulse is radiated from a transmitting antenna and used, for example, for measurement of a distance to an object.

For a radio frequency pulse radiated from an antenna to the outside, in order to prevent interference with other radio devices or the like, for example, a frequency band permitted by a legal regulation is specified. In the past, a technique of adjusting a pulse pattern of a radio frequency pulse so that the radio frequency pulse complies with a legal regulation has been known. For example, in the general radio frequency pulse generation device, a waveform of the pulse signal output from the pulse generator is adjusted using the low pass filter.

Further, Patent Document 1 discloses a technique of preventing interference, for example, by changing a band by changing a pulse shape or a center frequency when interference from other radio devices or the like is detected. As a result, when an interference wave is detected, it is possible to shift a transmission wave to a band other than a band having an interference wave within a range of complying with a legal regulation. In the technique disclosed in Patent Document 1, a pulse shaping unit changes a pulse shape and shifts a band of a transmission wave.

In a technique disclosed in Patent Document 2, a method of cutting a radio frequency signal of a local oscillator in a pulse form by performing on/off control by a clock signal having an arbitrary delay using two GaAs switches as a pulse shaping circuit is used. In this method, a pulse shape is decided according to rising and falling response characteristics of the GaAs switch.

CITATION LIST

Patent Document

Patent Document 1: JP 2007-336054 A
Patent Document 2: U.S. Pat. No. 6,690,741

DISCLOSURE OF THE INVENTION

Problem to be Solved by the Invention

However, in the general radio frequency pulse generation device in which the signal output from the pulse generator is adjusted through the low pass filter, it is necessary to adjust the low pass filter finely in order to generate a desirable monopulse. Thus, it takes time and efforts to adjust the low pass filter, for example, to change hardware or adjust a size.

Further, in the technique disclosed in Patent Document 1, in order to shift the band of the transmission wave by changing the pulse shape through the pulse shaping unit, the pulse shaping unit should have a complicated configuration such as a variable delay unit, a center frequency control unit, a pulse shape control unit, a band control unit, a modulation scheme control unit, a pulse repetitive frequency control unit, and a bias circuit. In addition, there is a problem in which it is necessary to perform an extremely fine adjustment using a high-speed signal in order to create the radio frequency pulse.

Further, in the method disclosed in Patent Document 2, since the pulse shape is decided according to the rising and falling response characteristics of the GaAs switch, there is a problem in that it is necessary to replace with another switch having different response characteristics in order to finely calibrate the pulse shape.

The invention was made in light of the foregoing, and it is an object of the present invention to provide a pulse generation device which is capable of suitably adjusting and outputting a pulse pattern by a simple configuration.

Means for Solving Problem

In order to solve the above problems, according to a first aspect of the present invention, a pulse generation device includes a baseband pulse generating unit including a pulse generator that generates a pulse train including two or more monopulses and a low pass filter that receives the pulse train output from the pulse generator and outputs a baseband pulse signal, wherein the pulse generator generates the pulse train based on a certain control signal adjusted so that the baseband pulse signal has a certain pulse waveform which does not exceed a certain limited range.

According to another aspect of the present invention, the pulse generation device further includes a radio frequency oscillator that generates a carrier wave of a certain frequency and a modulator that modulates the carrier wave output from the radio frequency oscillator using the baseband pulse signal output from the baseband pulse generating unit, and outputs a certain pulse signal.

According to another aspect of the present invention, in the pulse generation device, the control signal is a signal in which a certain number of bits, each of which has a certain time width are combined.

According to another aspect of the present invention, in the pulse generation device, the pulse train includes a main pulse including a monopulse having a first pulse width and one or more monopulses having a pulse width smaller than the first pulse width, the two monopulses being generated ahead of and/or behind the main pulse on a time axis.

According to another aspect of the present invention, in the pulse generation device, the one or more monopulses having the small pulse width have a frequency component of a cut-off frequency of a low pass filter or higher.

According to another aspect of the present invention, the pulse generation device further includes a timing generator that outputs the control signal to the pulse generator.

According to another aspect of the present invention, in the pulse generation device, the baseband pulse generating unit further includes a pulse pattern memory that stores the control pattern when a certain pulse pattern is output from the pulse generator.

According to another aspect of the present invention, in the pulse generation device, when the pulse pattern memory stores the control pattern, the pulse generator reads the control pattern from the pulse pattern memory and outputs the pulse pattern.

Effect of the Invention

According to the present invention, it is possible to provide a pulse generation device which is capable of suitably adjusting and outputting a pulse pattern by a simple configuration.

MODE(S) FOR CARRYING OUT THE INVENTION

Figure 1:
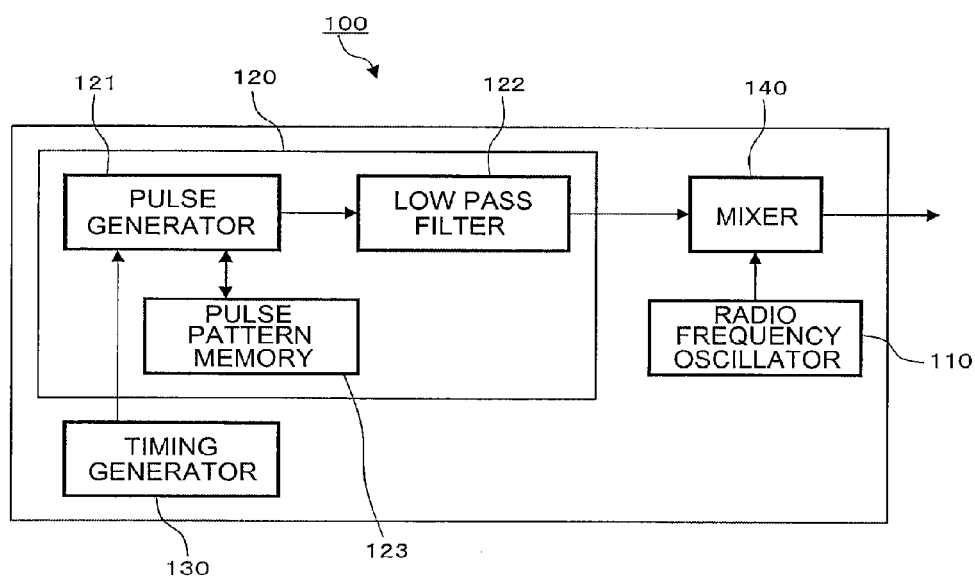
FIG. 1 is a block diagram illustrating a configuration of a pulse radar device according to an embodiment of the present invention.

A pulse generation device according to a preferred embodiment of the present invention will be described in detail with reference to the appended drawings. For the sake of simplicity of illustration and description, components having the same function are denoted by the same reference numerals.

First Embodiment

A pulse generation device according to a first embodiment of the present invention will be described below with reference to FIG. 1. FIG. 1 is a block diagram illustrating a configuration of a pulse generation device 100 according to the present embodiment. The pulse generation device 100 illustrated in FIG. 1 includes a radio frequency oscillator 110 that generates a carrier wave of a certain frequency, a baseband pulse generating unit 120 that generates a signal having a certain pulse shape at a baseband, a timing generator 130 that controls a timing to generate a pulse through the baseband pulse generating unit 120, and a modulator 140 that modulates the carrier wave output from the radio frequency oscillator 110 by the pulse output from the baseband pulse generating unit 120. Here, a mixer is used as an example of the modulator 140.

The baseband pulse generating unit 120 includes a pulse generator 121 that generates a pulse of a certain pulse width, a low pass filter 122 that adjusts a shape of the pulse output from the pulse generator 121, and a pulse pattern memory 123 that stores a control pattern of the pulse output from the pulse generator 121.

In the present embodiment, an oscillator frequency generated by the radio frequency oscillator 110 may be set to, for example, 24 GHz. Further, in the baseband pulse generating unit 120, the pulse width of the pulse generated by the pulse generator 121 may be set to, for example, 10 ns, and the cut-oft frequency of the low pass filter 122 may be set to, for example, 100 MHz.

In the pulse generation device 100 of the present embodiment, the pulse generator 121 is configured to operate according to a control signal input from the timing generator 130. For example, the timing generator 130 can output the control signal to the pulse generator 121 with a cycle of 1 ns, and the pulse generator 121 can adjust the pulse pattern in units of 1 ns and outputs the generated pulse pattern.

The pulse pattern memory 123 can store a pattern (control pattern) of the control signal output from the timing generator 130 when a certain pulse pattern is output from the pulse generator 121. Thus, instead of receiving the control signal from the timing generator 130 and generating a certain pulse pattern, the pulse generator 121 can receive the control pattern from the pulse pattern memory 123, generate a certain pulse pattern, and output the generated certain pulse pattern. In the case of receiving and using the control pattern stored in the pulse pattern memory 123, it is unnecessary to operate the timing generator 130. In this case, the control signal for receiving the control pattern from the pulse pattern memory 123 and outputting the certain pulse pattern can be output from the timing generator 130 or the outside to the pulse generator 121.

In the method of causing the monopulse to be output from the pulse generator 121 and input to the low pass filter 122 to shape the pulse waveform, in order to shape a pulse waveform of an output pulse in a desired shape (for example, in order to cause a pulse waveform of an output pulse to comply with a legal regulation), it is necessary that the low pass filter 122 can finely adjust a pulse waveform of an output pulse. In waveform-shaping by a combination of the monopulse and the low pass filter, it is possible to create waveforms of various characteristics by adjusting a type or an order of the low pass filter.

However, when the cut-off frequency of the low pass filter is set to be low, an amplitude is decreased by a degree by which extending on a frequency axis is suppressed. Further, when the cut-off frequency of the low pass filter is set to be high, an amplitude is increased but a bandwidth on a frequency axis is too large. As described above, it is not easy to adjust the waveform of the output pulse by changing the cut-off frequency of the low pass filter.

Further, it is also possible to adjust the pulse waveform finely by increasing the order of the low pass filter, but a circuit size of the low pass filter is increased. In addition, when the type of the low pass filter is changed, there is a problem in that the waveform is unbalanced. When the waveform of the output pulse is adjusted through the low pass filter as described above, since there are a lot of adjustment parameters of the low pass filter, and a hardware configuration is also likely to be changed, it is extremely difficult to adjust.

Figure 2A:
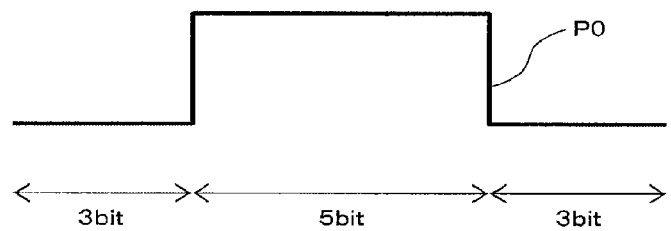
FIG. 2A is a bit pattern diagram illustrating an exemplary pulse pattern signal.
Figure 2B:
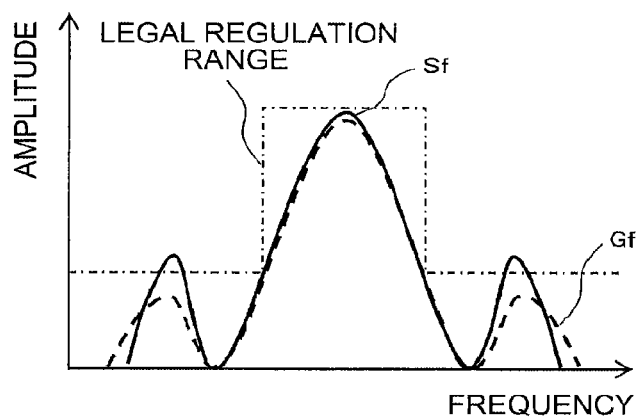
FIG. 2B is a waveform diagram of a radio frequency pulse on a frequency axis.
Figure 2C:
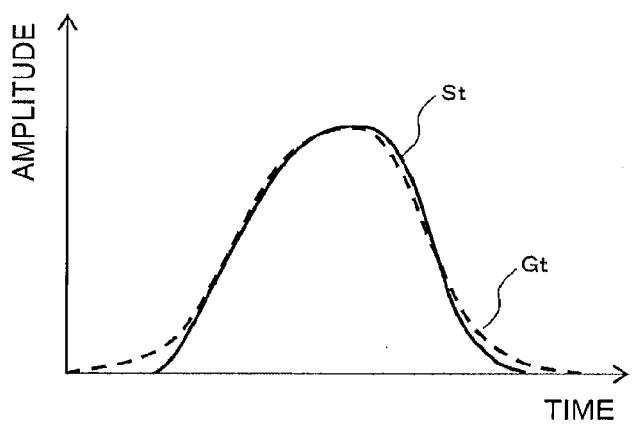
FIG. 2C is a time waveform diagram of an envelope of a radio frequency pulse.

FIG. 2A to 2C illustrate exemplary waveforms of a monopulse signal that is shaped using a low pass filter. FIG. 2A illustrates a waveform of a monopulse signal P0 that is input from the timing generator 130 to the pulse generator 121, and FIGS. 2B and 2C illustrate a waveforms of an output pulse obtained by up-converting a pulse signal having passed through the low pass filter through the mixer 140 using solid lines Sf. In FIG. 2A, a horizontal axis denotes a bit string using a certain unit time (for example, 1 ns) as one bit. The bit string of the horizontal axis corresponds to a time, and FIG. 2A illustrates a waveform of the monopulse signal P0 on a time axis. Here, a monopulse having a pulse width of 5 bits (5 ns) is illustrated.

FIG. 2B illustrates a waveform on a frequency axis in which a horizontal axis denotes a frequency, and FIG. 2C illustrates a waveform on a time axis in which a horizontal axis denotes a time. In the waveform on the frequency axis illustrated in FIG. 2B, as an example of a certain frequency band, a frequency band in which a radio wave complying with legal regulation is permitted to be radiated is indicated as a legal regulation range by an alternate long and short dash line. FIGS. 2B and 2C illustrate a waveform Gf on the frequency axis and a waveform Gt on the time axis when an output pulse is a Gaussian pulse using dotted lines, respectively. The Gaussian pulse is an example of a pulse having a desirable pulse waveform.

The waveform Sf of the output pulse of FIG. 2B that has passed through the low pass filter 122 and the mixer 140 includes a main lobe that is within a radiation permissible band and a side lobe that is outside the radiation permissible band. The waveform of the main lobe satisfies with (does not exceed) the legal regulation range, but the side lobe that is outside the radiation permissible band exceeds the legal regulation range. On the other hand, both the main lobe and the side lobe of the waveform Gf of the Gaussian pulse satisfy with the legal regulation range.

The waveforms on the time axis corresponding to the waveforms (Sf and Gf) of the output pulse and the Gaussian pulse on the frequency axis illustrated in FIG. 2B are indicated by the solid line St and the dotted line Gt in FIG. 2C. As can be seen from FIGS. 2B and 2C, it is possible to prevent the output pulse from exceeding the legal regulation range by approximating the waveform of the output pulse to the Gaussian pulse. However, when the waveform of the monopulse is adjusted only by the low pass filter 122, the waveform of the output pulse gets close to a triangular wave shape, and there is a limitation to a range within which a waveform can be adjusted.

In this regard, the pulse generation device 100 of the present embodiment is configured to be capable of arbitrarily adjusting a pulse input to the low pass filter 122 instead of adjusting the low pass filter 122. In other words, the pulse generator 121 of the baseband pulse generating unit 120 can output a pulse pattern (a pulse train) including two or more pulses such as a pulse width modulation (PWM) control signal without limiting a pulse to be output to a monopulse.

The pulse pattern output from the pulse generator 121 can be adjusted by the control signal input from the timing generator 130. When an output period of the control signal is set to 1 ns, the timing generator 130 can arbitrarily adjust the pulse pattern output from the pulse generator 121 in units of 1 ns.

As described above, in the pulse generation device 100 of the present embodiment, by adjusting the control signal output from the timing generator 130, it is possible to arbitrarily adjust the pulse pattern output from the pulse generator 121 within a possible range with the output period of the control signal. Thus, it is possible to approximate the pulse waveform output from the pulse generation device 100 to the waveform of the Gaussian pulse by suitably adjusting the control signal output from the timing generator 130.

Figure 3:
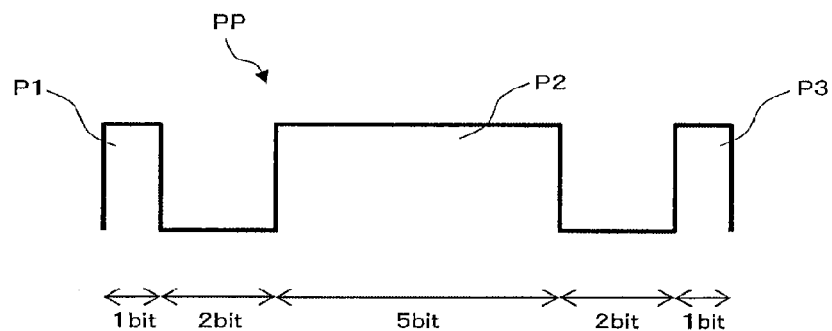
FIG. 3 is an explanatory diagram illustrating an exemplary pulse pattern adjusted to satisfy a legal regulation.
Figure 4:
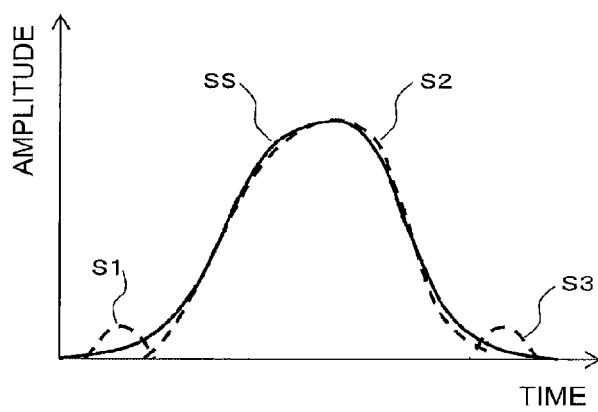
FIG. 4 is a time waveform diagram illustrating a pulse pattern and exemplary waveform forming of an envelope formed by a low pass filter.

FIG. 3 illustrates an exemplary pulse pattern that is adjusted so that a waveform of an output pulse is approximated to a waveform of a Gaussian pulse. A pulse pattern PP illustrated in FIG. 3 is a pattern of the control signal that is output from the timing generator 130 to the pulse generator 121, and three pulses, that is, a monopulse P1 of a one-bit width, a monopulse P2 of a five-bit width, and a monopulse P3 of a one-bit width are sequentially output at intervals of two bits. Upon receiving the pulse pattern PP, the pulse generator 121 outputs a pulse train including three monopulses corresponding to the pulse pattern PP. FIG. 4 illustrates a pulse waveform of an output pulse on a time axis that is obtained in such a manner that the waveform of the pulse pattern PP is shaped by the pulse generator 121 and the low pass filter 122, and the resultant pulse pattern PP is up-converted by the mixer 140 and output.

In FIG. 4, pulse waveforms on a time axis when the three monopulses P1, P2, and P3 are independently input to the pulse generator 121 and then outputs from the pulse generation device 100 are indicated by dotted lines S1, S2, and S3, and a pulse waveform on a time axis when the pulse pattern PP is input from the timing generator 130 to the pulse generator 121, passes through the low pass filter 122, and then is output from the pulse generation device 100 is indicated by a solid line SS.

In the waveform on the time axis illustrated in FIG. 4, a pulse waveform S2 when the main pulse P2 of a 5-bit width is output from the pulse generation device 100 has a waveform having a large amplitude. On the other hand, the monopulses P1 and P3 of a one-bit width, which are ahead of and behind the main pulse P2, are signals having the cut-off frequency of the low pass filter 122 or higher and thus have waveforms S1 and S3 having a small amplitude. Thus, a pulse waveform when the pulse pattern PP is input to the pulse generator 121, waveform-shaped by the low pass filter 122, and then output from the pulse generation device 100 becomes a pulse waveform SS in which the pulse waveform S2 is combined with the pulse waveforms S1 and S3 formed on front and rear hem portions thereof.

The pulse waveform SS is adjusted in such a manner that the amplitude of the hem portion of the pulse waveform S2 is combined with the pulse waveforms S1 and S3. As a result, the pulse waveform SS on the time axis becomes substantially equivalent to the waveform Gt of the Gaussian pulse, and the waveform of the output pulse on the frequency axis becomes equivalent to the waveform Gf of the Gaussian pulse on the frequency axis illustrated in FIG. 2B as well. As a result, the pulse generation device 100 of the present embodiment can reduce the amplitude of the side lobe that is outside the radiation permissible band without extending the main lobe to the outside of the radiation permissible band and can generate the output pulse satisfying the legal regulation range.

Further, in the pulse pattern PP illustrated in FIG. 3, the pulse width of the monopulse P2 is set to 5 bits, the pulse widths of the monopulses P1 and P3 are set to 1 bit, and an interval between the monopulses P1 and P2 and an interval between the monopulses P2 and P3 are set to 2 bits, but the present invention is not limited to this example, and a pulse width and a pulse interval can be appropriately adjusted.

As described above, when an output pulse satisfying the legal regulation range is obtained, the control pattern output from the timing generator 130 to the pulse generator 121 at that time is stored in the pulse pattern memory 123. Thereafter, the pulse generator 121 receives the control pattern from the pulse pattern memory 123, and the pulse pattern satisfying the legal regulation range in the same control pattern is output to the low pass filter 122. As a result, the pulse generation device 100 of the present embodiment can output a pulse complying with the legal regulation without using the timing generator 130. Further, in the present embodiment, the timing generator 130 may be omitted. In this case, for example, measures of storing the control pattern of the pulse generator 121 in the pulse pattern memory 123 in advance and controlling a timing to generate a pulse through the pulse generator 121 from the outside of the pulse generation device 100 may be taken.

When the pulse generator 121 receives the control pattern from the pulse pattern memory 123 and generates the pulse train, a control signal to control a timing thereof may be input from the timing generator 130 or the outside.

According to the pulse generation device 100 of the present embodiment, it is possible to suitably adjust and output a pulse pattern by a simple configuration. In other words, by inputting an arbitrary bit string signal from the timing generator 130, the pulse pattern memory 123, or the outside of the pulse generation device 100 to the pulse generator 121 and causing the bit string signal to pass through the low pass filter 122, it is possible to adjust a pulse waveform, perform up-conversion up to a certain radiation permissible band through the mixer 140, and output a converted result. As a result, it is possible to generate and output a pulse complying with a legal regulation. The pulse generation device 100 of the present embodiment can easily adjust a pulse waveform without changing hardware such as a low pass filter or using a complicated adjusting circuit.

As described above, in the pulse generation device 100 of the present embodiment, since it is easy to adjust a pulse pattern, for example, it is possible to easily generate a pulse signal having a shape close to a shape of a Gaussian pulse having a desirable pulse pattern shape. Since the shape of the pulse pattern is close to the shape of the Gaussian pulse, it is possible to reduce an unnecessary side lobe. Thus, it is possible to reduce an object detection error while complying with a legal regulation using the pulse generation device 100 of the present embodiment for pulse generation of a radar device.

Further, the pulse generation device 100 of the present embodiment illustrated in FIG. 1 may be configured to output the baseband pulse signal generated by the baseband pulse generating unit 120 without up-converting the baseband pulse signal through the carrier wave. In this case, the radio frequency oscillator 110 and the mixer 140 may not be provided. The pulse generation device having the above configuration functions as a baseband generating device.

The description of the present embodiment has proceeded with an example of the pulse radar device according to the present invention, and the present invention is not limited to this example. For example, the detailed configuration and the detailed operation of the pulse radar device according to the present embodiment can be appropriately changed within the scope not departing from the gist of the present invention.

EXPLANATIONS OF LETTERS OR NUMERALS

100 Pulse generation device
110 Radio frequency oscillator
120 Baseband pulse generating unit
121 Pulse generator
122 Low pass filter
123 Pulse pattern memory
130 Timing generator
140 Modulator

The invention claimed is:

1. A pulse generation device, comprising:
   baseband pulse generating circuitry including a pulse generator that generates a pulse train including two or more monopulses and a low pass filter that receives the pulse train output from the pulse generator and outputs a baseband pulse signal, wherein
   the pulse generator generates the pulse train based on a certain control signal adjusted so that the baseband pulse signal has a certain pulse waveform which does not exceed a certain limited range,
   the pulse train includes a main pulse including a main monopulse having a first pulse width and one or more monopulses having a pulse width smaller than the first pulse width, the one or more monopulses being generated ahead of or behind the main monopulse on a time axis, and
   the one or more monopulses having the smaller pulse width have a frequency component of a cut-off frequency of the low pass filter or higher.

2. The pulse generation device according to claim 1, further comprising:
   a radio frequency oscillator that generates a carrier wave of a certain frequency; and
   a modulator that modulates the carrier wave output from the radio frequency oscillator using the baseband pulse signal output from the baseband pulse generating circuitry, and outputs a certain pulse signal.

3. The pulse generation device according to claim 1, wherein the control signal is a signal in which a certain number of bits, each of which has a certain time width are combined.

4. The pulse generation device according to claim 1, further comprising,
   a timing generator that outputs the control signal to the pulse generator.

5. The pulse generation device according to claim 1, wherein the baseband pulse generating circuitry further includes a pulse pattern memory that stores a control pattern when a certain pulse pattern is output from the pulse generator.

6. The pulse generation device according to claim 5, wherein when the pulse pattern memory stores the control pattern,
   the pulse generator reads the control pattern from the pulse pattern memory and outputs the pulse pattern.

* * * * *